(12) United States Patent
Joo

(10) Patent No.: US 8,130,338 B2
(45) Date of Patent: Mar. 6, 2012

(54) LIQUID CRYSTAL DISPLAY DEVICE

(75) Inventor: Hyung Dal Joo, Daejeon-si (KR)

(73) Assignee: LG. Display Co. Ltd., Seoul (KR)

( * ) Notice: Subject to any disclaimer, the term of this patent is extended or adjusted under 35 U.S.C. 154(b) by 490 days.

(21) Appl. No.: 12/257,847

(22) Filed: Oct. 24, 2008

(65) Prior Publication Data

US 2011/0149200 A1    Jun. 23, 2011

(30) Foreign Application Priority Data

Oct. 26, 2007  (KR) .................. 10-2007-0108224

(51) Int. Cl.
*G02F 1/1335* (2006.01)
*G09F 13/04* (2006.01)

(52) U.S. Cl. ..................... 349/61; 349/56; 362/97.1
(58) Field of Classification Search ............ 349/56, 349/58, 155, 156, 158, 160, 61; 362/97.1, 362/97.2, 97.3
See application file for complete search history.

(56) References Cited

U.S. PATENT DOCUMENTS

| | | | |
|---|---|---|---|
| 6,452,649 B1 * | 9/2002 | Ono et al. | 349/61 |
| 7,445,358 B2 * | 11/2008 | Matsushita | 362/330 |
| 7,490,971 B2 * | 2/2009 | Iwasaki | 362/628 |
| 2007/0147759 A1 * | 6/2007 | Matsushita | 385/129 |
| 2011/0149200 A1 * | 6/2011 | Joo | 349/61 |

* cited by examiner

*Primary Examiner* — Brian Healy
(74) *Attorney, Agent, or Firm* — Brinks Hofer Gilson & Lione

(57) ABSTRACT

A liquid crystal display device that is capable of preventing the damage to optical sheets and a liquid crystal panel due to vibration and impact is disclosed. The liquid crystal display device includes a liquid crystal panel for controlling transmissivity of liquid crystal to display images, a backlight unit configured to include a plurality of optical sheets for irradiating light to the liquid crystal panel, and a support main for supporting the liquid crystal panel and the backlight unit, the support main having a protrusion curved to prevent the droop of the liquid crystal panel at the middle thereof. With the above construction, it is possible to minimize the friction between the liquid crystal panel and the optical sheets, prevent the formation of wrinkles or scratches at the optical sheets, and prevent the optical sheets from being rubbed.

6 Claims, 6 Drawing Sheets

LIQUID CRYSTAL DISPLAY DEVICE

CROSS-REFERENCE TO RELATED APPLICATION

This application claims the benefit of Korean Patent Application No. 10-2007-108224, filed on Oct. 26, 2007, which is hereby incorporated by reference in its entirety as if fully set forth herein.

BACKGROUND OF THE INVENTION

1. Field of the Invention

The present invention relates to a liquid crystal display device, and more particularly, to a liquid crystal display device that is capable of preventing damage to optical sheets and a liquid crystal panel due to vibration and impact.

2. Discussion of the Related Art

Recently, various flat panel displays, which solve the disadvantages of a cathode ray tube, i.e., reduce weight and volume, are on the rise. These flat panel displays include a liquid crystal display, a field emission display, a plasma display panel, a light emitting display, etc.

A liquid crystal display device controls optical transmissivity using an electric field to display images. To this end, the liquid crystal display device includes a liquid crystal panel having liquid crystal cells, a backlight unit for irradiating light to the liquid crystal panel, and a drive circuit for driving the liquid crystal cells.

The liquid crystal panel of the liquid crystal display device is a non-emissive element that displays images through the adjustment of the amount of light incident from the outside, and therefore, the liquid crystal display device needs an additional light source, i.e., the backlight unit, for irradiating light to the liquid crystal panel. Based on the installation position of the backlight unit, the backlight unit may be classified as an edge-type backlight unit or a direct-type backlight unit.

The edge-type backlight unit includes lamps disposed at opposite sides of the liquid crystal panel for generating light, a light guide plate disposed below the liquid crystal panel for guiding the light generated from the lamps to the liquid crystal panel, lamp housings disposed at sides of the respective lamps for protecting the respective lamps, and optical sheets disposed on the lamp housings and the light guide plate for uniformly transmitting light to the liquid crystal panel.

Recently, the thickness of the liquid crystal display device has been reduced. As a result, the distance between the liquid crystal panel and the optical sheets has decreased. For this reason, the liquid crystal display device is designed to prevent the contact between the liquid crystal panel and the optical sheets. However, the liquid crystal panel comes into contact with the optical sheets due to the droop of the liquid crystal panel at the middle thereof.

Friction may occur between the liquid crystal panel and the optical sheets, which are in contact with each other, due to vibration and impact caused during transportation or vibration tests of the liquid crystal panel. The optical sheets, scratched by such friction, deteriorate the display quality of the liquid crystal display device.

SUMMARY

A liquid crystal display device includes a liquid crystal panel for controlling transmissivity of liquid crystal to display images, a backlight unit for irradiating light to the liquid crystal panel, and a support main for supporting the liquid crystal panel and the backlight unit, the support main having a protrusion curved to prevent the droop of the liquid crystal panel at the middle thereof.

In another aspect of the present invention, a liquid crystal display device includes a liquid crystal panel for controlling transmissivity of liquid crystal to display images, a backlight unit configured to include a plurality of optical sheets for irradiating light to the liquid crystal panel, a support main for supporting the liquid crystal panel and the backlight unit, and an adhesive pad attached to the top of the support main for fixing the liquid crystal panel and preventing the droop of the liquid crystal panel at the middle thereof.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
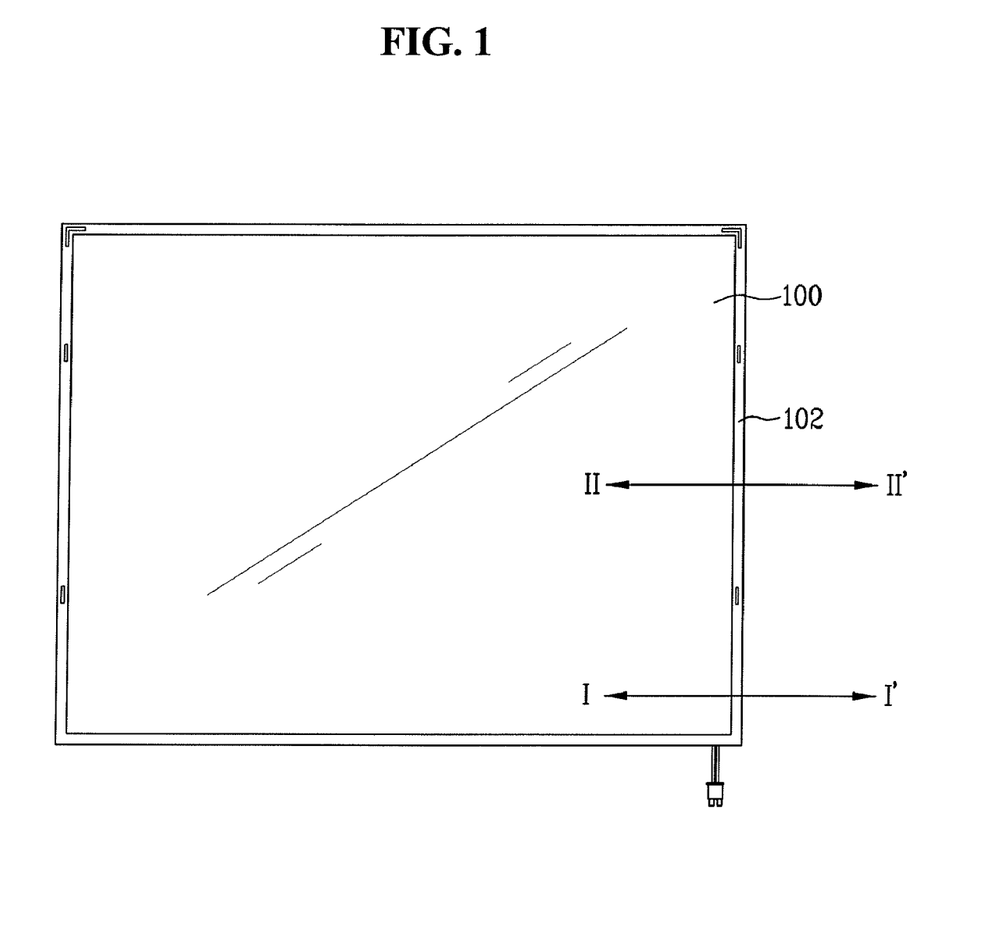
FIG. 1 is a perspective view illustrating a liquid crystal display device according to an embodiment of the present invention.
Figure 2:
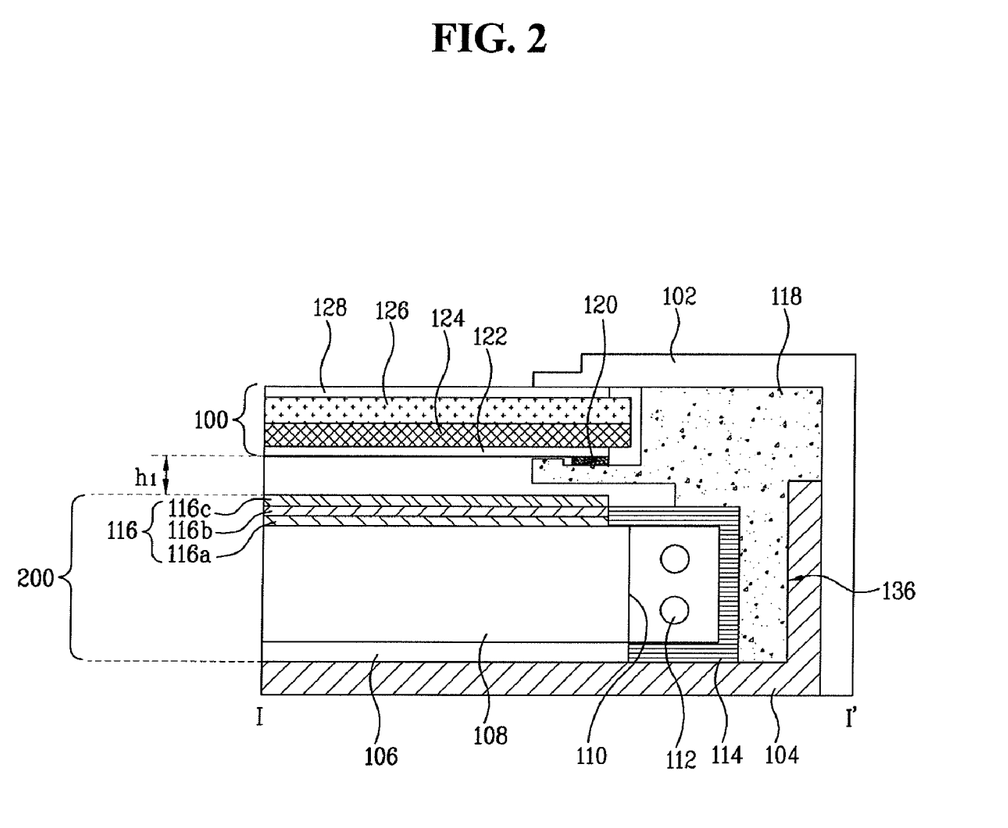
FIG. 2 is a sectional view taken along line I-I' of the liquid crystal display device according to the present invention shown in FIG. 1.
Figure 3A:
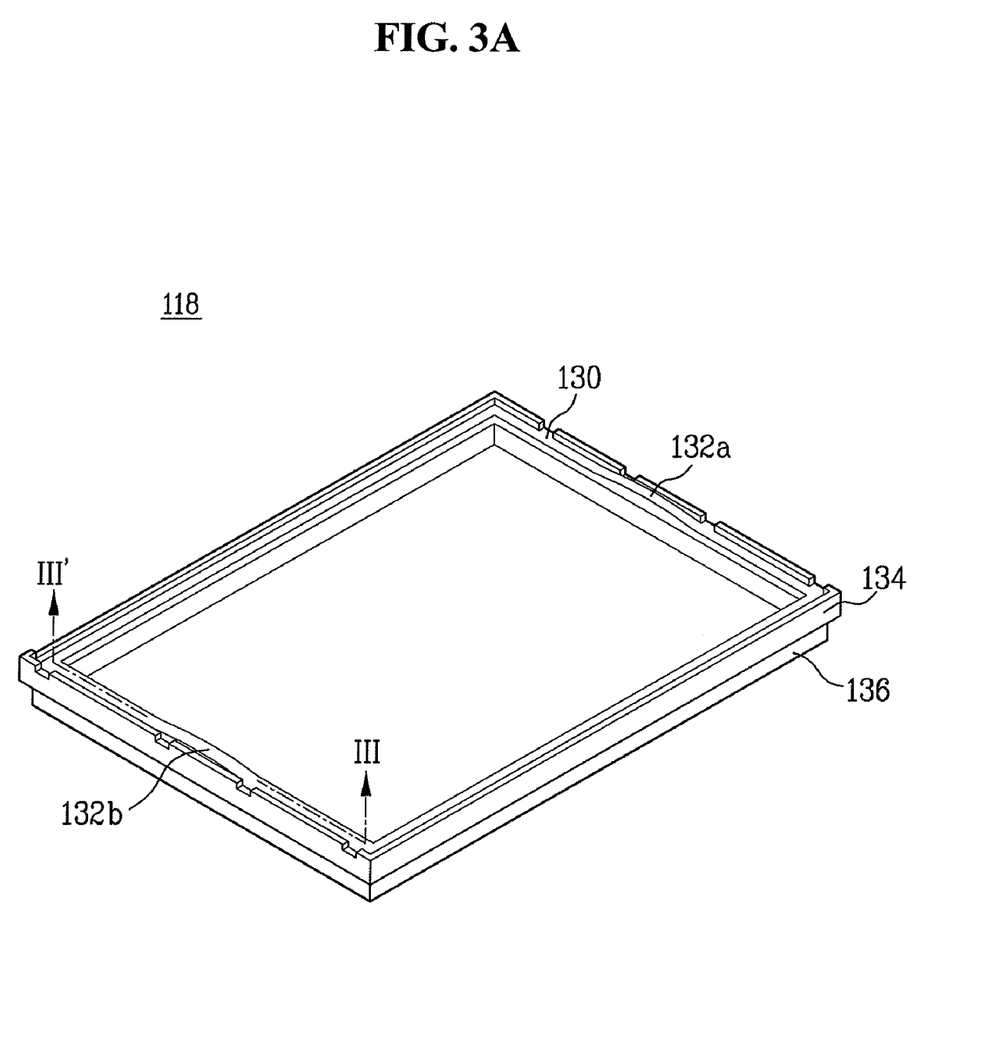
FIGS. 3A and 3B are perspective views illustrating a support main according to an embodiment of the present invention.
Figure 3B:
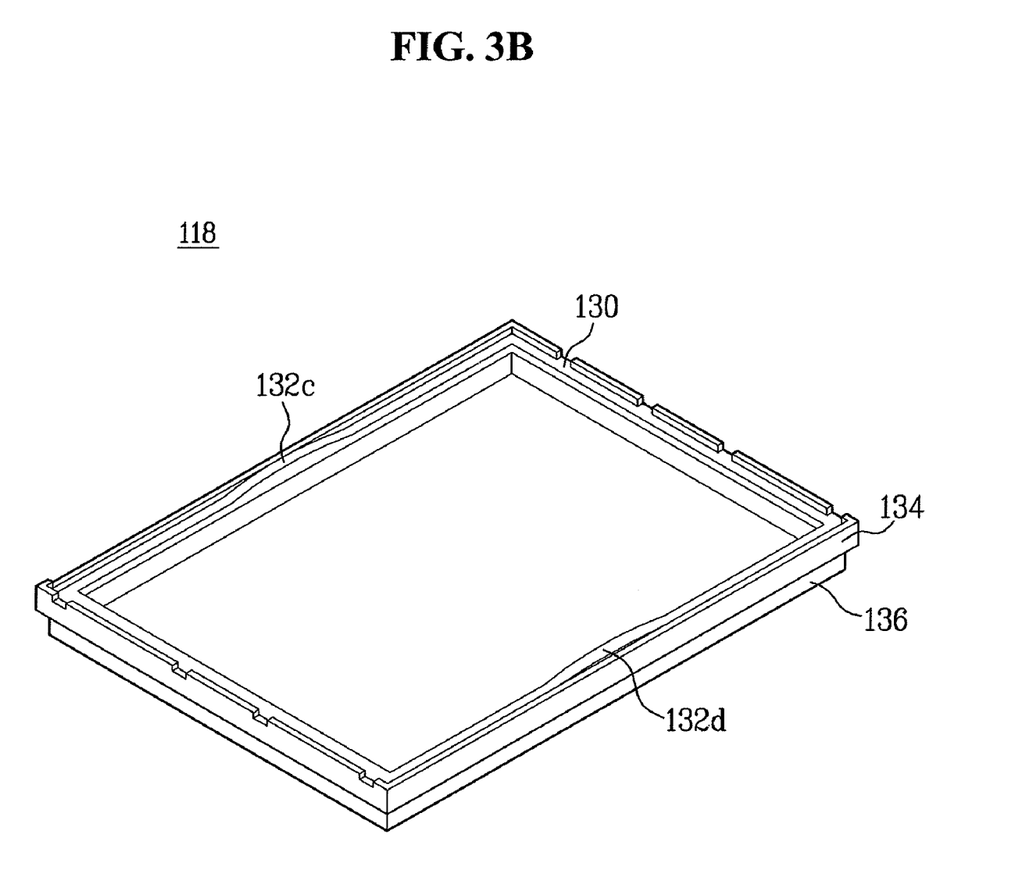

FIG. 1 is a perspective view illustrating a liquid crystal display device according to an embodiment of the present invention, FIG. 2 is a sectional view taken along line I-I' of the liquid crystal display device according to the present invention shown in FIG. 1, and FIGS. 3A and 3B are perspective views illustrating a support main according to an embodiment of the present invention.

Referring to FIGS. 1, 2, 3A and 3B the liquid crystal display device according to the present invention includes a liquid crystal panel 100 for controlling transmissivity of liquid crystal to display images, a backlight unit 200 configured to include a plurality of optical sheets 116 for irradiating light to the liquid crystal panel 100, and a support main 118 for supporting the liquid crystal panel 100 and the backlight unit 200, the support main 118 having protrusions 132a and 132b curved to prevent the droop of the liquid crystal panel 100 at the middle thereof.

The liquid crystal panel 100 includes a lower substrate 124 and an upper substrate 126, which are joined to each other while being opposite to each other. Between the lower substrate 124 and the upper substrate 126 are interposed a liquid crystal layer (not shown) and a spacer (not shown) for uniformly maintaining the distance between the lower substrate 124 and the upper substrate 126.

The upper substrate 126 includes at least three color filters, e.g., red, green, and blue color filters, a black matrix for separating the respective color filters from one another and defining pixel cells, and a common electrode to which common voltage is applied. The common electrode may be formed at the lower substrate 124 according to liquid crystal mode.

The lower substrate 124 includes a plurality of data lines and a plurality of gate lines, which intersect one another, thin film transistors (TFT) formed at pixel cell areas defined by the intersection between the data lines and the gate lines, and pixel electrodes connected to the thin film transistors. The thin film transistors respond to gate pulses from the gate lines to transmit image signals from the data lines to the liquid crystal cells (not shown).

The liquid crystal cells include the common electrode and the pixel electrodes, which are connected to the respective thin film transistors. The pixel electrodes face the common electrode while the liquid crystal layer is disposed between the pixel electrodes and the common electrode. Consequently, the liquid crystal cells may be represented as liquid crystal capacitors. Also, each liquid crystal cell includes a storage capacitor (not shown) for maintaining an image signal charged in the corresponding liquid crystal capacitor until the corresponding liquid crystal capacitor is charged with the next image signal. Also, a lower polarizing film 122 is attached to the bottom of the lower substrate 124 such that the lower polarizing film 122 faces the optical sheets 116. The lower polarizing film 122 serves to polarize light irradiated from the optical sheets 116. The transmission axis of the lower polarizing film 122 is arranged at a predetermined angle such that the transmission axis of the lower polarizing film 122 coincides with the orientation direction of the liquid crystal layer.

To the top of the upper substrate 126 is attached an upper polarizing film 128. The upper polarizing film 128 serves to polarize light transmitted through the liquid crystal layer and the color filter array substrate. The transmission axis of the upper polarizing film 128 is arranged at predetermined angle such that the transmission axis of the upper polarizing film 128 is perpendicular to the transmission axis of the lower polarizing film 122.

A top cover 102 covers the front edge of the liquid crystal panel 100 disposed at a bottom cover 104 and the side of the bottom cover 104. To this end, the top cover 102 includes a plane part for covering the non-display area excluding the display area of the liquid crystal panel 100, i.e., the edge of the liquid crystal panel 100, and a side part bent perpendicularly from the plane part for covering the side of the bottom cover 104. The bottom cover 104 is formed to receive the backlight unit 200 and the support main 118. The bottom cover 104 may be made of a material exhibiting high heat conductivity to discharge heat generated from the backlight unit 200 outside.

The backlight unit 200 includes at least one light source 112, a reflective sheet 106 stacked on the bottom cover 104, a light guide plate 108 disposed on the reflective sheet 106, a light source housing 114 for guiding light generated from the at least one light source 112 to the light guide plate 108, and a plurality of optical sheets 116 stacked on the light guide plate 108.

The at least one light source 112 is disposed at one-side edge of the bottom cover 104 such that the at least one light source 112 is opposite to a light entrance part 110 of the light guide plate 108. The at least one light source 112 may be a fluorescent lamp or a light emitting diode. The at least one light source 112 is driven by light source voltage applied from the outside to generate light and irradiate the generated light to the light entrance part 110 of the light guide plate 108.

The reflective sheet 106 is disposed at the bottom of the bottom cover 104 for reflecting light advancing toward the rear of the light guide plate 108 toward the liquid crystal panel 100 to prevent optical loss. The reflective sheet 106 has a size equal to or greater than that of the light guide plate 108 to prevent the leakage of light reflected in the light guide plate 108.

The light guide plate 108 is disposed on the bottom cover 104 to which the reflective sheet 106 is attached. The light guide plate 108 scatters the light irradiated from the at least one light source 112 through the light entrance part 110 and sends the scattered light toward the liquid crystal panel 100. That is, the light guide plate 108 converts light incident from the at least one light source 112 into planar light and irradiates the planar light to the optical sheets 116. The light guide plate 108 may be made of a plastic material, such as polymethyl methacrylate (PMA), a resin material, or a glass material exhibiting high heat resistance. Also, the light guide plate 108 may be formed in a flat type structure or a wedge type structure.

The light guide plate 108 may be a prism light guide plate including an inclined rear plane and a prismatic exit plane having a peak and a valley formed in the shape of a line or a circle. In other words, a plurality of prism patterns having peaks and valleys may be formed at the exit plane of the light guide plate 108.

The light source housing 114 is disposed at one side of the light guide plate 108 for protecting the at least one light source 112. The light source housing 114 guides light from the at least one light source 112 to the light entrance part 110 of the light guide plate 108 and prevents the light guide plate 108 from approaching the at least one light source 112 and thus the damage to the at least one light source 112.

The optical sheets 116 improve the brightness and uniformity of light exiting from the light guide plate 108 and irradiate the light, the brightness and uniformity of which have been improved, to the liquid crystal panel 100. To this end, the optical sheets 116 include diffusion sheets 116a and 116b for diffusing the light exiting from the light guide plate 108 to the overall areas and at least one prism sheet 116c for condensing the light diffused by the diffusion sheets 116a and 116b. The diffusion sheets 116a and 116b and the at least one prism sheet 116c may be stacked sequentially, nonsequentially, or alternately to improve the brightness and uniformity of light.

The support main 118 is located at the bottom cover 104 to fix the backlight unit 200.

As shown in FIGS. 3A and 3B, the support main 118 includes a sidewall frame 134 constituting the external appearance of the support main 118, a panel location part 130 where the liquid crystal panel 100 is located, an adhesive pad 120 for fixing the liquid crystal panel 100 on the panel location part 130, a coupling groove 136 for allowing the support main 118 to be coupled to the bottom cover 120 thereby, and projections 132a to 132d formed at the middle of the top of the panel location part 130.

The sidewall frame 134 is formed in the shape of a rectangular frame. The coupling groove 136 is formed at the lower outside part of the sidewall frame 134 such that the inside wall of the bottom cover 104 is coupled to the coupling groove 136. The outside wall of the bottom cover 104 does not protrude outwardly of the sidewall frame 134 by virtue of the coupling groove 136.

The panel location part 130 supports the rear edge of the liquid crystal panel 100. Also, the panel location part 130 is provided at the middle of the top thereof with protrusions 132a and 132b for preventing the droop of the liquid crystal panel 100 at the middle thereof.

The adhesive pad 120 is attached to the panel location part 130 of the support main 118. The liquid crystal panel 100 is fixed to the panel location part 130 by the adhesive pad 120. The adhesive pad 120 is made of a semitransparent SKC JS 15R based material, which is manufactured by mixing polyethylene terephthalate (PET) and a dispersing agent. The adhesive pad 120 is attached to the panel location part 130 by a 3M-based polyurethane adhesive, with the result that the creation of foreign matter due to high temperature is prevented.

Figure 5A:
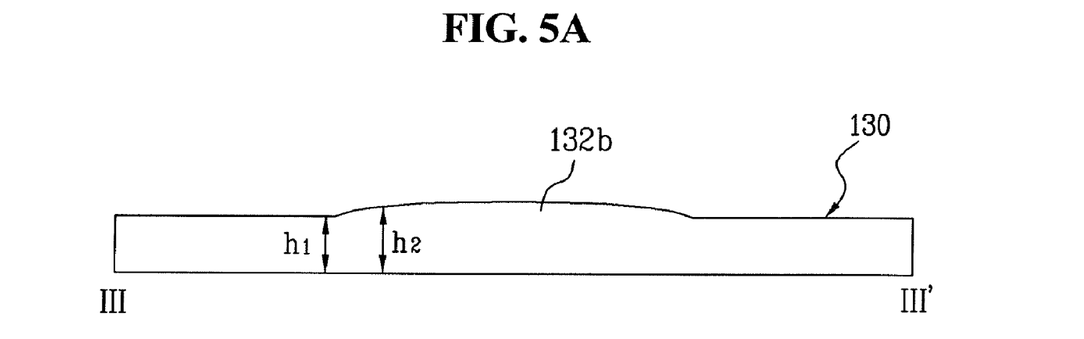
FIGS. 5A to 5C are sectional views illustrating other embodiments of the support main according to the present invention.

The protrusions may be formed at the middle of one or more sides of the panel location part 130. In the drawings, the protrusions 132a to 132d are formed at the middles of four side portions of the panel location part 130. The protrusions 132a to 132d have a gentle inclination such that the liquid crystal panel 100 is safely located on the panel location part 130. Also, the protrusions 132a to 132d have a height equivalent to the difference between the edge height h1 of the support main 118 where the protrusion 132b is not formed and the middle height h2 of the support main 118 where the protrusion 132b is formed, as shown in FIG. 5A. Preferably, the height of the protrusions 132a to 132d is about 0.1 mm or more, which is necessary to correct the bending of the liquid crystal panel 100.

Figure 4:
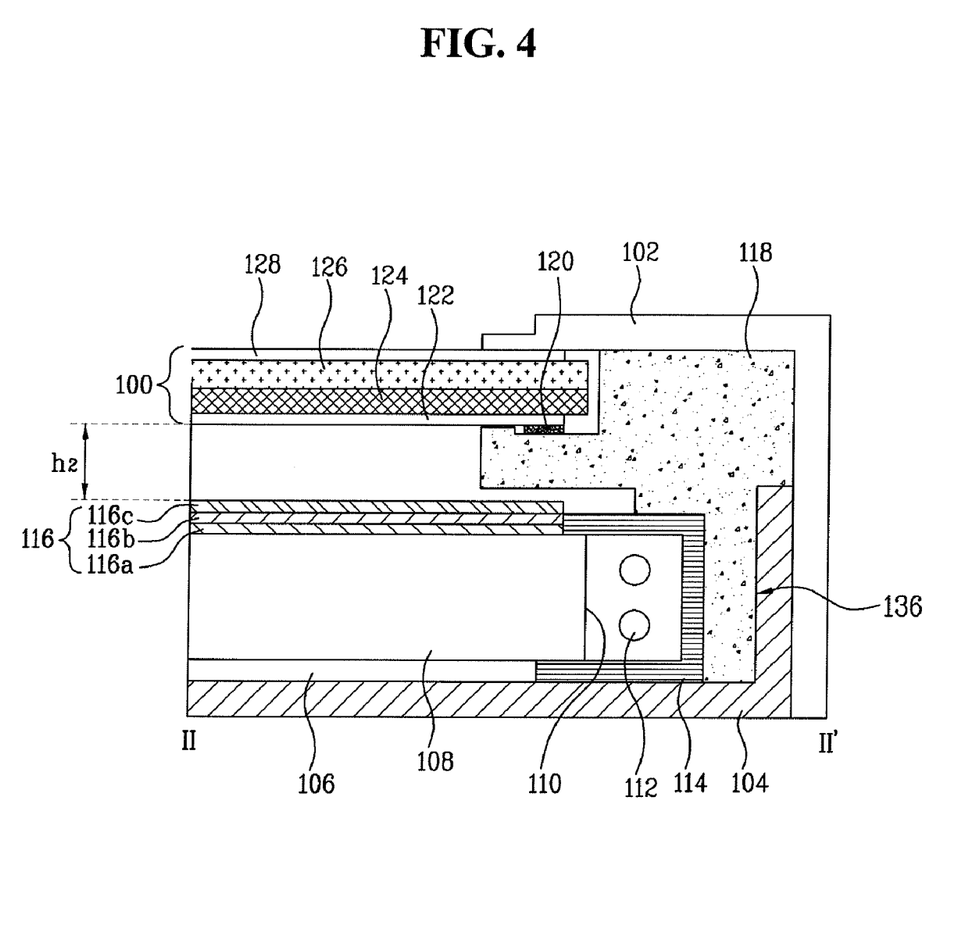
FIG. 4 is a sectional view taken along line II-II' of the liquid crystal display device according to the present invention shown in FIG. 1.

Consequently, as shown in FIGS. 2 and 4, the middle height h2 of the liquid crystal panel 100 is greater than the edge height h1 of the liquid crystal panel 100, with the result that the optical sheets are prevented from being rubbed or damaged due to the droop of the liquid crystal panel 100 at the middle thereof.

Figure 5B:
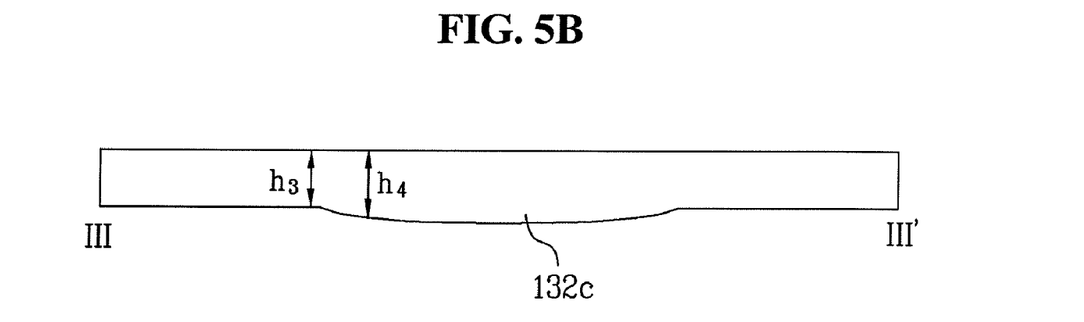

FIG. 5B is a sectional view illustrating the structure of a support main according to a second embodiment of the present invention. A liquid crystal display device according to a second embodiment of the present invention is identical in construction to the liquid crystal display device according to the previous first embodiment of the present invention except the structure of the support main, particularly, the protrusions of the support main, and therefore, a detailed description of the same construction will not be given.

As previously described, the support main 118 according to the first embodiment of the present invention is constructed in a structure in which the protrusions 132a and 132b are formed at the top of the support main 118 where the liquid crystal panel 100 is attached. In the second embodiment of the present invention, as shown in FIG. 5B, the protrusion 132 is formed at the bottom of the support main 119 with which the optical sheets 116 are in contact to prevent the droop of the liquid crystal panel 100 at the middle thereof. The protrusion 132c is formed at the middle of at least one side of the bottom of the panel location part 130. The protrusion 132c is formed with a gentle inclination not to damage the optical sheets 116. Also, the protrusion 132c has a height equivalent to the difference between the edge height h3 of the support main 118 where the protrusion 132c is not formed and the middle height h4 of the support main 118 where the protrusion 132c is formed, as shown in FIG. 5A. Preferably, the height of the protrusion 132c is about 0.1 mm or more, which is necessary to correct the bending of the liquid crystal panel 100.

Figure 5C:
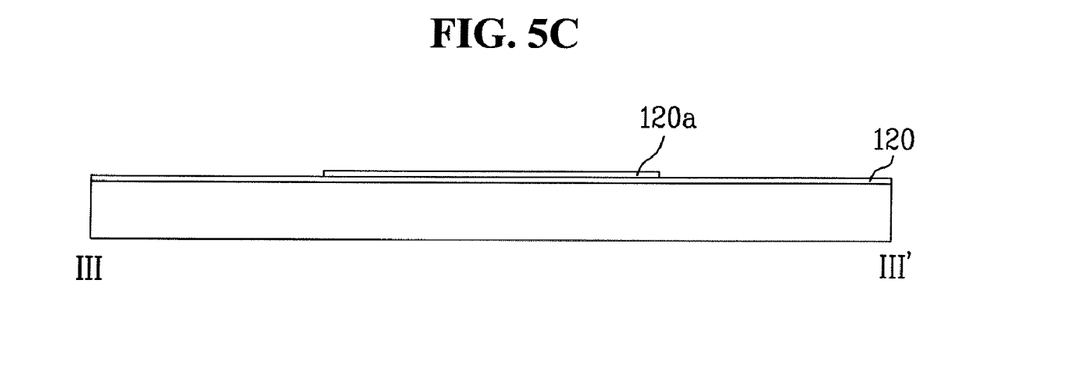

FIG. 5C is a sectional view illustrating the structure of a support main according to a third embodiment of the present invention. A liquid crystal display device according to a third embodiment of the present invention is identical in construction to the liquid crystal display device according to the previous first embodiment of the present invention except the structure of the support main, particularly, the protrusions of the support main, and therefore, a detailed description of the same construction will not be given.

Referring to FIG. 5C, an auxiliary adhesive pad 120a is additionally attached to the adhesive pad 120, which is attached to the panel location part 130 of the support main 118 to fix the liquid crystal panel 100, such that the adhesive pad 120 has a height to correct the bending of the liquid crystal panel 100, without changing the frame structure of the support main 118 as in the previous first and second embodiments of the present invention, thereby preventing the droop of the liquid crystal panel 100. The auxiliary adhesive pad 120a is attached to the middle of at least one side of the panel location part 130. Preferably, the height of the auxiliary adhesive pad 120a is about 0.1 mm or more, which is necessary to correct the bending of the liquid crystal panel 100.

In the liquid crystal display device with the above-stated construction according to the present invention, therefore, it is possible to prevent the friction between the liquid crystal panel 100 and the optical sheet 116, which may occur when the liquid crystal panel 100 droops at the middle thereof due to the reduction in thickness of the liquid crystal display device and thus the reduction in distance between the liquid crystal panel 100 and the optical sheets 116, by the provision of the gently inclined protrusions 132a and 132b formed at one or more sides of the support main 118 which supports the liquid crystal panel 100. Consequently, it is possible to minimize the friction between the liquid crystal panel 100 and the optical sheets 116, prevent the formation of wrinkles or scratches at the optical sheets 116, and prevent the optical sheets 116 from being rubbed.

Apparent from the above description, the liquid crystal display device with the above-stated construction according to the present invention is constructed to prevent the friction between the liquid crystal panel and the optical sheet, which may occur when the liquid crystal panel droops at the middle thereof due to the reduction in thickness of the liquid crystal display device and thus the reduction in distance between the liquid crystal panel and the optical sheets, by the provision of the gently inclined protrusion formed at least one side of the support main which supports the liquid crystal panel. Consequently, the present invention has the effect of minimizing the friction between the liquid crystal panel and the optical sheets, preventing the formation of wrinkles or scratches at the optical sheets, and preventing the optical sheets from being rubbed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display device comprising:
a liquid crystal panel that controls transmissivity of liquid crystal to display images;
a backlight unit that irradiates light to the liquid crystal panel; and a support main that supports the liquid crystal panel and the backlight unit, the support main having a protrusion curved to prevent the droop of the liquid crystal panel;

wherein the support main includes a panel location part where the liquid crystal panel is located;

wherein the panel location part supports the rear edge of the liquid crystal panel; and wherein the protrusion is formed at the middle of the top of the panel location part such that the protrusion is in direct contact with the rear edge of the liquid crystal panel.

2. The liquid crystal display device according to claim 1, wherein the protrusion has a gentle incline about the middle of at least one side of the panel location part.

3. The liquid crystal display device according to claim 1, wherein the protrusion has a height of about 0.1 mm or more.

4. A liquid crystal display device comprising:

a liquid crystal panel that controls transmissivity of liquid crystal to display images;

a backlight unit configured to include a plurality of optical sheets that irradiate light to the liquid crystal panel;

a support main that supports the liquid crystal panel and the backlight unit; and an adhesive pad attached to the top of the support main that fixes the liquid crystal panel and prevents the droop of the liquid crystal panel;

wherein the support main includes a panel location part where the liquid crystal panel is located;

wherein the panel location part supports the rear edge of the liquid crystal panel; and wherein the adhesive pad is formed at the middle of the top of the panel location part such that the adhesive pad is in direct contact with the rear edge of the liquid crystal panel.

5. The liquid crystal display device according to claim 4, wherein the adhesive pad is constructed in a structure in which a plurality of layers are stacked about the middle of at least one side of the support main such that the adhesive pad has a gentle incline.

6. The liquid crystal display device according to claim 5, wherein the adhesive pad has a height of about 0.1 mm or more.

* * * * *